United States Patent
Aharoni et al.

(10) Patent No.: US 9,632,998 B2
(45) Date of Patent: Apr. 25, 2017

(54) CLAIM POLARITY IDENTIFICATION

(71) Applicant: International Business Machines Corporation, Armonk, NY (US)

(72) Inventors: Ehud Aharoni, Kfar Saba (IL); Roy Bar-Haim, Ramat Gan (IL); Indrajit Bhattacharya, Bangalore (IN); Francesco Dinuzzo, Dublin (IE); Dan Gutfreund, Raanana (IL); Amrita Saha, Bangalore (IN); Noam Slonim, Jerusalem (IL); Chen Yanover, Zichron Yaakov (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/721,007

(22) Filed: May 26, 2015

(65) Prior Publication Data

US 2016/0350278 A1    Dec. 1, 2016

Related U.S. Application Data

(60) Provisional application No. 62/014,137, filed on Jun. 19, 2014.

(51) Int. Cl.
*G06F 17/27* (2006.01)
*G06F 17/30* (2006.01)

(52) U.S. Cl.
CPC .......... *G06F 17/2705* (2013.01); *G06F 17/27* (2013.01); *G06F 17/2785* (2013.01); *G06F 17/30011* (2013.01); *G06F 17/30283* (2013.01)

(58) Field of Classification Search
CPC ..... G10L 13/027; G10L 13/043; G10L 15/26; G06F 17/2785; G06F 17/30719; G06F 17/241

USPC .................................................. 703/9; 704/9
See application file for complete search history.

(56) References Cited

U.S. PATENT DOCUMENTS

| | | | |
|---|---|---|---|
| 8,166,032 B2* | 4/2012 | Sommer | G06F 17/3071 707/736 |
| 2009/0282019 A1* | 11/2009 | Galitsky | G06F 17/30634 |
| 2011/0078167 A1* | 3/2011 | Sundaresan | G06F 17/2785 707/765 |
| 2012/0271788 A1* | 10/2012 | Fang | G06F 17/2735 706/50 |

(Continued)

OTHER PUBLICATIONS

Pang et al "Opinion mining and sentiment analysis", Foundations and Trends in Information Retrieval, vol. 2, No. 1-2, 2008.*

(Continued)

*Primary Examiner* — Huyen Vo
*Assistant Examiner* — Yi-Sheng Wang (57) ABSTRACT

A method comprising using at least one hardware processor for: receiving (a) a proposition and (b) a plurality of claims; identifying a local claim polarity of each claim of the plurality of claims with respect to the proposition; calculating a pairwise claim polarity agreement score for each pair of claims of the pairs of claims reflecting the likelihood of said each pair of claims to have the same claim polarity, wherein the pairwise claim polarity agreement score is associated with each claim of the pair of claims; and determining a global claim polarity for each claim of the plurality of claims based on the local claim polarity of the claim and pairwise claim polarity agreement scores associated with said each claim.

13 Claims, 5 Drawing Sheets

(56) References Cited

U.S. PATENT DOCUMENTS

2014/0019443 A1* 1/2014 Golshan ............ G06F 17/30867
707/723

OTHER PUBLICATIONS

Liu "Sentiment Analysis and Opinion Mining", Morgan & Claypool Publisher, Apr. 22, 2012.*
Pang et al K"A Sentiment Education: Sentiment Analysis Using Subjectivity Summarization Based on Minimum Cuts", Proceedings of ACL, 2004.*
Moilanen et al "Sentiment Composition" Proceeding of Recent Advances in Natural Language Processing 2007.*

* cited by examiner

CLAIM POLARITY IDENTIFICATION

CROSS-REFERENCE TO RELATED APPLICATIONS

This application claims the benefit of U.S. Provisional Patent Application No. 62/014,137, entitled "Claim Polarity Identification", filed Jun. 19, 2014, the contents of which are incorporated herein by reference in their entirety.

BACKGROUND

The present invention relates to the field of text analysis and synthesis.

A basic task that people engage in on a daily basis is to provide claims with respect to some topic and support these claims. For example, people may require claims to persuade others in the course of a debate over a certain topic. Persuading can either take the form of influencing someone to take your point of view, agreeing to your opinion, performing a certain task and so forth. Examples can come from various domains such as law, politics, marketing, financial and business advising, IP protection, etc. In such scenarios, people are required to provide convincing claims and counter claims in order to persuade the other side.

Text mining, also referred to as text analytics (or analysis), is often defined as the automated process of deriving high-quality information from text (specifically, large amounts of text) via computer processing. High-quality information is typically derived through the devising of patterns and trends through means such as statistical pattern learning and machine learning. Text mining usually involves the process of structuring the input text (usually parsing, along with the addition of some derived linguistic features and the removal of others, and subsequent insertion into a database), deriving patterns within the structured data, and finally evaluation and interpretation of the output. 'High quality' in text mining usually refers to some combination of relevance, novelty, and interestingness. Typical text mining tasks may include text categorization, text clustering, concept/entity extraction, production of granular taxonomies, sentiment analysis, document summarization, and entity relation modeling (i.e., learning relations between named entities).

Text analysis may involve information retrieval, lexical analysis to study word frequency distributions, pattern recognition, tagging/annotation, information extraction, data mining techniques including link and association analysis, visualization, and predictive analytics. The overarching goal may be, essentially, to turn text into data for analysis, via application of methods such as natural language processing (NLP) and analytical methods.

With continuous advancements and an increase in user popularity, data mining and text analysis technologies may serve as an invaluable resource across a wide range of disciplines.

The technology is now broadly applied for a wide variety of needs, including government, research and business needs. Applications of text analysis may include intelligence, security, e-discovery, records management, publishing, automated ad placement, social media monitoring, scientific discovery etc.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a method comprising using at least one hardware processor for: receiving (a) a proposition and (b) a plurality of claims; and performing sentiment analysis of the proposition and the plurality of claims, to determine a polarity of each of the plurality of claims with respect to the proposition.

There is further provided, in accordance with an embodiment, a computer program product comprising a non-transitory computer-readable storage medium having program code embodied therewith, the program code executable by at least one hardware processor for: receiving (a) a proposition and (b) a plurality of claims; and performing sentiment analysis of the proposition and the plurality of claims, to determine a polarity of each of the plurality of claims with respect to the proposition.

There is yet further provided, in accordance with an embodiment, a system comprising: (i) a non-transitory storage device having stored thereon instructions for: receiving (a) a proposition and (b) a plurality of claims, and performing sentiment analysis of the proposition and the plurality of claims, to determine a polarity of each of the plurality of claims with respect to the proposition; and (ii) at least one hardware processor configured to execute said instructions.

Some embodiments further comprise a step or a program instruction of: calculating a pairwise claim polarity agreement score for every pair of the plurality of claims, wherein the pairwise claim polarity agreement score reflects the likelihood of said every pair to have the same claim polarity, and wherein the pairwise claim polarity agreement score is associated with each claim of every pair of claims.

Some embodiments further comprise a step or a program instruction of: determining a global claim polarity for each claim of the plurality of claims, based on (a) the claim polarity of said each claim and (b) the pairwise claim polarity agreement score associated with said each claim.

Some embodiments further comprise a step or a program instruction of: determining a global claim polarity for each claim of the plurality of claims, based on a clustering of the plurality of claims according to commonality, wherein the determining of the polarity of each of the plurality of claims is based on the global claim polarity.

In some embodiments, the commonality is determined based on a lack of a flip-of-polarity connective between claims of the plurality of claims.

In some embodiments, the determining of said polarity of each of the plurality of claims comprises: analyzing said each claim to identify its claim topic and claim sentiment; analyzing said proposition to identify its proposition topic and proposition sentiment; detecting a contrast between said proposition topic and said claim topic; and calculating a local claim polarity for said each claim based on said proposition sentiment, said claim sentiment and said contrast.

In some embodiments, said identifying of said claim sentiment comprises: applying sentiment annotation to said each claim, to identify phrases in said each claim with positive and negative polarity; and extracting a set of features from the identified phrases, and performing sentiment classification.

In some embodiments, said phrases are identified in said each claim by using a technique selected from the group consisting of: linguistic processing, sentiment matching and sentiment composition.

Some embodiments further comprise a step or a program instruction of: identifying inter-claim relations between pairs of claims of the plurality of claims, wherein said calculating of said pairwise claim polarity agreement score for said each pair of claims is based on the identified inter-claim relations between the pairs of claims.

In some embodiments, said calculating of said pairwise claim polarity agreement score comprises extracting features and predicting an agreement between the polarity of said each pair of claims; said identifying of said inter-claim relations comprises: identifying discourse and structure-based relations between said each pair of claims, and identifying semantic relations between said each pair of claims; and said identified discourse and structure-based relations and said identified semantic relations serve as said features.

In some embodiments, said determining of said global claim polarity comprises modeling said global claim polarity as a partition between Con claims and Pro claims that minimizes a cost function.

In some embodiments, said cost function equals the sum of: the sum of the probabilities of being a Con claim of the claims of said plurality of claims partitioned as Pro claims; the sum of the probabilities of being a Pro claim of the claims of said plurality of claims partitioned as Con claims; and the sum of the probabilities that a pair of claims have the same polarity of all of the pairs of claims of said plurality of claims such that one claim is partitioned as Pro and the other as Con.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Automatic identification of the polarity of given claims with respect to a given proposition (i.e., including a topic and optionally a sentiment towards the topic) is herein disclosed. Such a tool may be useful, for example, for persuasion purposes. In such a scenario, one may require only claims having a polarity which serves his or her purpose, i.e., either supporting a debated proposition or contesting it. Claims with an opposite polarity may help to predict counter claims that the other party may raise, and prepare an appropriate response in advance.

Identification of text polarity may be performed based on both subjective utterances analysis (e.g., analysis of opinions, emotions, evaluations, stances etc.) and factual utterances analysis. Nevertheless, a sentiment analysis approach may be applied by assuming an extended notion of "sentiment", which refers to positive and negative expressions and sentences, both factual and subjective. The polarity identification may be based on the determination of the relations between the two given texts: the claim and the proposition and a local polarity may be determined for each claim.

Furthermore, relations between the claims may also provide valuable information that may improve sentiment accuracy. Based on claim relations, it is possible to determine the likelihood of two claims having the same polarity. Such pairwise polarity agreement scores (or probabilities) may be used together with a local claim polarity score (or probability) to perform global (joint) determination of claim polarity with respect to the received proposition.

The term "proposition" as referred to herein, may relate to a given concise statement. The proposition may include a topic (also referred as topic under consideration (TUC)). The proposition may further include a sentiment towards the topic. For example, if the proposition is: "The sale of violent video games to minors should be banned", then the proposition expresses a negative sentiment ("should be banned") towards its topic (i.e., "the sale of violent video games to minors").

The term "claim", as referred to herein may relate to a general, typically concise statement that directly supports or contests a proposition. An example is described herein below:

Proposition: The sale of violent video games to minors should be banned

Pro Claim (i.e., supporting the proposition): Violent video games can increase children's aggression.

Con Claim (i.e., contesting the proposition): Violence in video games is not causally linked with aggressive tendencies.

The term "polarity" as referred to herein with respect to a claim, may relate to a relation expressed by the claim towards a proposition. The relation may be in terms of Pro, i.e., supporting the proposition, or Con, i.e., contesting the proposition.

Figure 1:
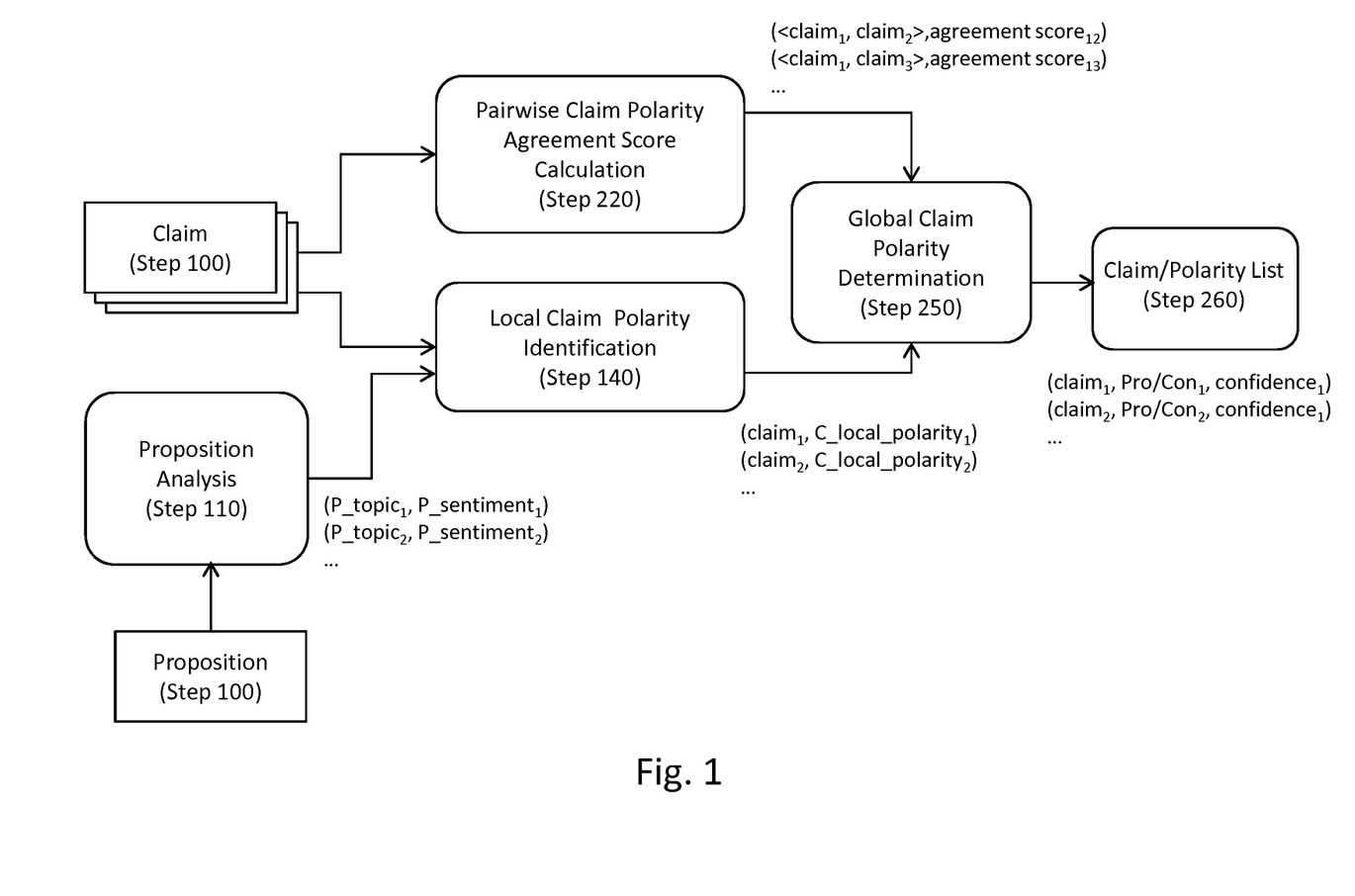
FIG. 1 shows a block diagram presenting a flow of a method, constructed and operative in accordance with an embodiment of the disclosed technique.

Reference is now made to FIG. 1, which shows a block diagram presenting a flow of a method, constructed and operative in accordance with an embodiment of the disclosed technique.

In a step 100, a proposition (notated P) and a plurality of claims (notated C) may be received. The proposition may include a proposition topic (notated P_topic) and a proposition sentiment (notated P_sentiment). The proposition topic may be a consecutive and grammatically correct phrase in the proposition, about which the proposition makes the most explicit positive or negative statement. The proposition sentiment is the sentiment of the proposition towards its topic. In a step 110, the received proposition may be analyzed. The analysis may include two steps, as specifically shown in FIG. 2. A step 120 of extracting the proposition topic from the proposition and a step 130 of analyzing the proposition sentiment towards the topic.

Figure 2:
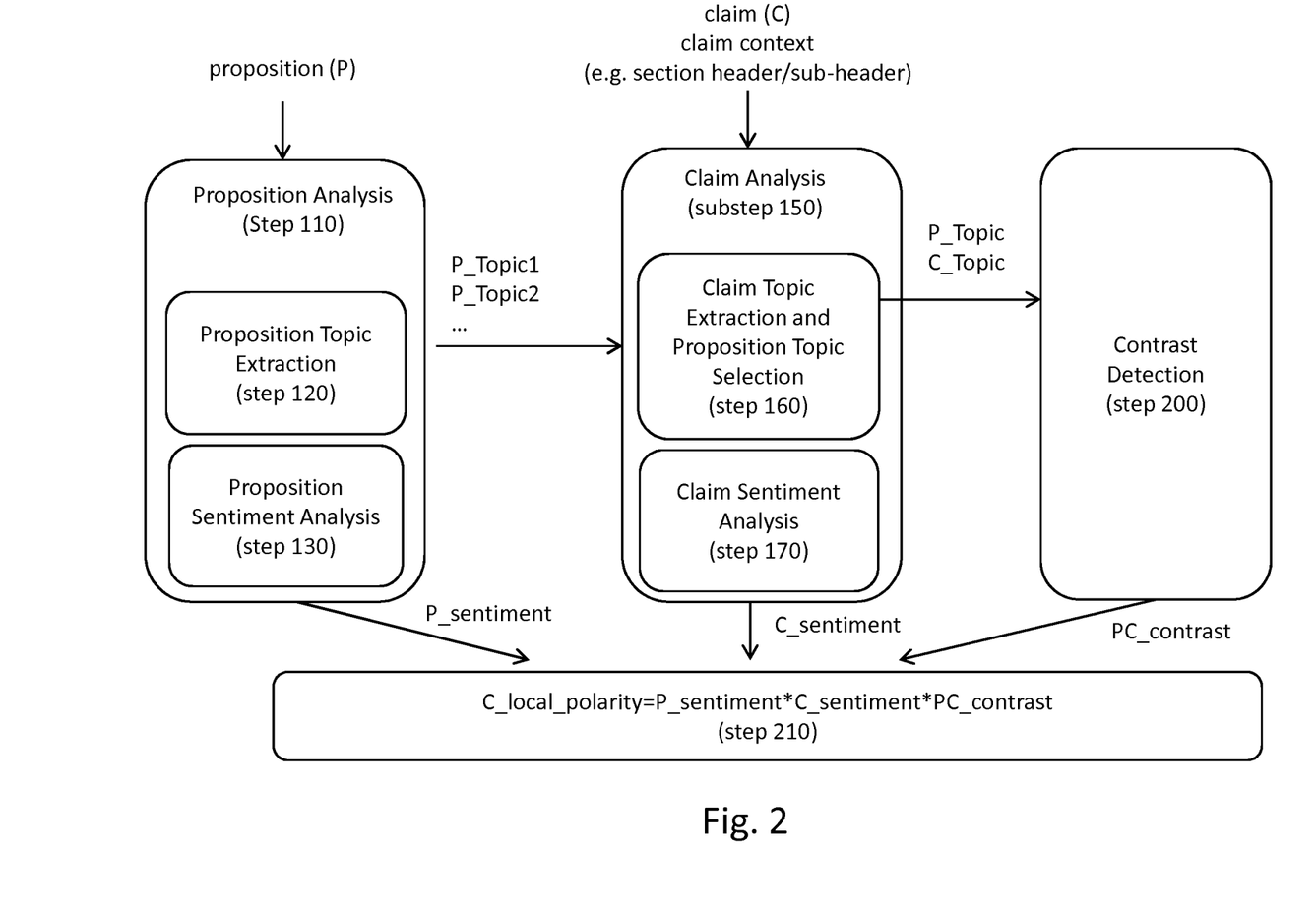
FIG. 2 shows a block diagram presenting the flow of local claim polarity identification.

The goal of proposition analysis is to identify the proposition topic and its associated proposition sentiment. As an example, for the proposition "The sale of violent video games to minors should be banned", the proposition topic may be: "The sale of violent video games to minors", and the proposition sentiment is negative.

The proposition may have more than one proposition topic. This may occur, for instance, when the proposition is a comparative sentence, e.g.: "Evolution has disproved Creationism". This sentence may be interpreted as having two proposition topics: Evolution and Creationism, where the first proposition topic may receive positive sentiment and the second may receive negative sentiment. In such cases the output may include a list of proposition topics, where each proposition topic may be assigned with a proposition sentiment (notated: ($P\_topic_1$, $P\_sentiment_1$), ($P\_topic_2$, $P\_sentiment_2$) etc.).

Since propositions may be typically short and simple sentences having a regular structure, the proposition topic and proposition sentiment may be identified by using templates such as:
<TOPIC> should be <SENTIMENT_VERB> (e.g. <sale of violent video games to minors> should be <banned>); or
<TOPIC> is/was <SENTIMENT_ADJECTIVE> (e.g. <bribery> is sometimes <acceptable>).
Defining the above templates as syntactic patterns (e.g. dependency sub-trees with variables) may allow in the second example to ignore the adjunct "sometimes".

The proposition sentiment may be determined based on the polarity of the sentiment terms matched to the template. In the above examples, the first proposition will have a negative sentiment based on the negative polarity of "ban", and the second proposition will have a positive sentiment due to the positive polarity of "acceptable". The polarity of sentiment terms may be determined based on sentiment lexicons.

In a step 140, the local polarity of each claim with respect to the proposition may be identified. This step may be performed by steps 150-210, as will be detailed below. Reference is now made to FIG. 2, which shows a block diagram presenting the flow of local claim polarity identification.

A local polarity of a claim is the polarity of the claim which may be determined independently of other claims. A claim may include a claim topic (notated C_topic) and a claim sentiment (notated C_sentiment). The claim topic may be a consecutive and grammatically correct phrase in the claim, about which the claim makes the most explicit positive or negative statement. The claim sentiment is the sentiment of the claim towards the claim topic. For example, in the claim "Violent video games can increase children's aggression", the claim topic is "Violent video games" and the sentiment is negative. In contrast to the claim polarity, which is the relation between the claim and the proposition, the claim sentiment depends only on the claim itself.

If the claim sentiment and the proposition sentiment are the same, then the claim may be determined as supporting the proposition (i.e., the local claim polarity is Pro). If the claim sentiment and the proposition sentiment are opposite, then the claim may be determined as contesting the proposition (i.e., the local polarity of the claim is Con).

For example, the sentiment of both the proposition "The sale of violent video games to minors should be banned" and the claim "Violent video games can increase children's aggression" are negative, hence the claim supports the proposition (i.e., it is a Pro claim).

This above scheme may be valid if the claim topic and the proposition topic are similar, in the sense that supporting (contesting) the claim topic implies supporting (contesting) the proposition topic. Thus, having similar claim sentiment and proposition sentiment (in terms of positive and negative) implies that the claim supports the proposition. If the topics are opposite, namely, supporting the claim topic implies contesting the proposition topic (and similarly, contesting the claim topic implies supporting the proposition topic), then the above scheme should be reversed: the claim supports the proposition if they have opposite sentiments, and contests it otherwise. The relation between the claim topic and the proposition topic (similar or opposite) is herein termed "contrast relation".

In the following example:
Proposition: Atheism is the only way.
Claim: Religious belief is a delusion.
The proposition topic "Atheism" and the claim topic "Religious belief" are opposite, and the claim and the proposition have opposite sentiments. Therefore, the claim has a Pro polarity.

Thus, in a step 150, each of the received claims may be analyzed. This step may include a step 160 of claim topic extraction in order to identify the claim topic. In case of multiple proposition topics, a proposition topic selection may be performed. The proposition topic which may best match the claim topic, may be selected.

Claim topic extraction may be performed by extracting candidate phrases from the claim. This may be done based on the syntactic structure of the claim or by identification of various concepts in the claim text (e.g. noun phrases that are entries in Wikipedia). Each candidate phrase may then receive a score representing its likelihood of being the claim topic. The score may be a function of a set of numeric features extracted for a candidate phrase. The function may be set manually or learned by training a classifier over training examples of correct and incorrect claim topics. The following types of features may be used in such a machine learning approach:
(a) Syntactic features which may capture the syntactic function of the candidate phrase in the sentence;
(b) Positional and contextual features (e.g. whether the candidate phrase is found at the beginning of the sentence, the word immediately following the candidate etc.);
(c) Features based on the content of the candidate phrase, e.g. whether the phrase has an entry in Wikipedia, its specificity (e.g. its inverse document frequency in Wikipedia) and so on;
(d) Semantic relatedness between the candidate phrase and the proposition topic, using known Natural Language Processing (NLP) methods for measuring semantic relatedness; and
(e) Sentiment-based features which may assess whether the candidate phrase is the sentiment target in the claim.

In case of multiple proposition topics, such a classifier may be applied for each candidate phrase, i.e., claim topic candidate, with each proposition topic, and the highest-scoring (candidate phrase, proposition topic) pair will be selected.

Claim analysis may further include a step 170 of claim sentiment analysis which outputs C_sentiment. A reference is now made to FIG. 3, which shows a block diagram presenting the flow of claim sentiment analysis.

Figure 3:
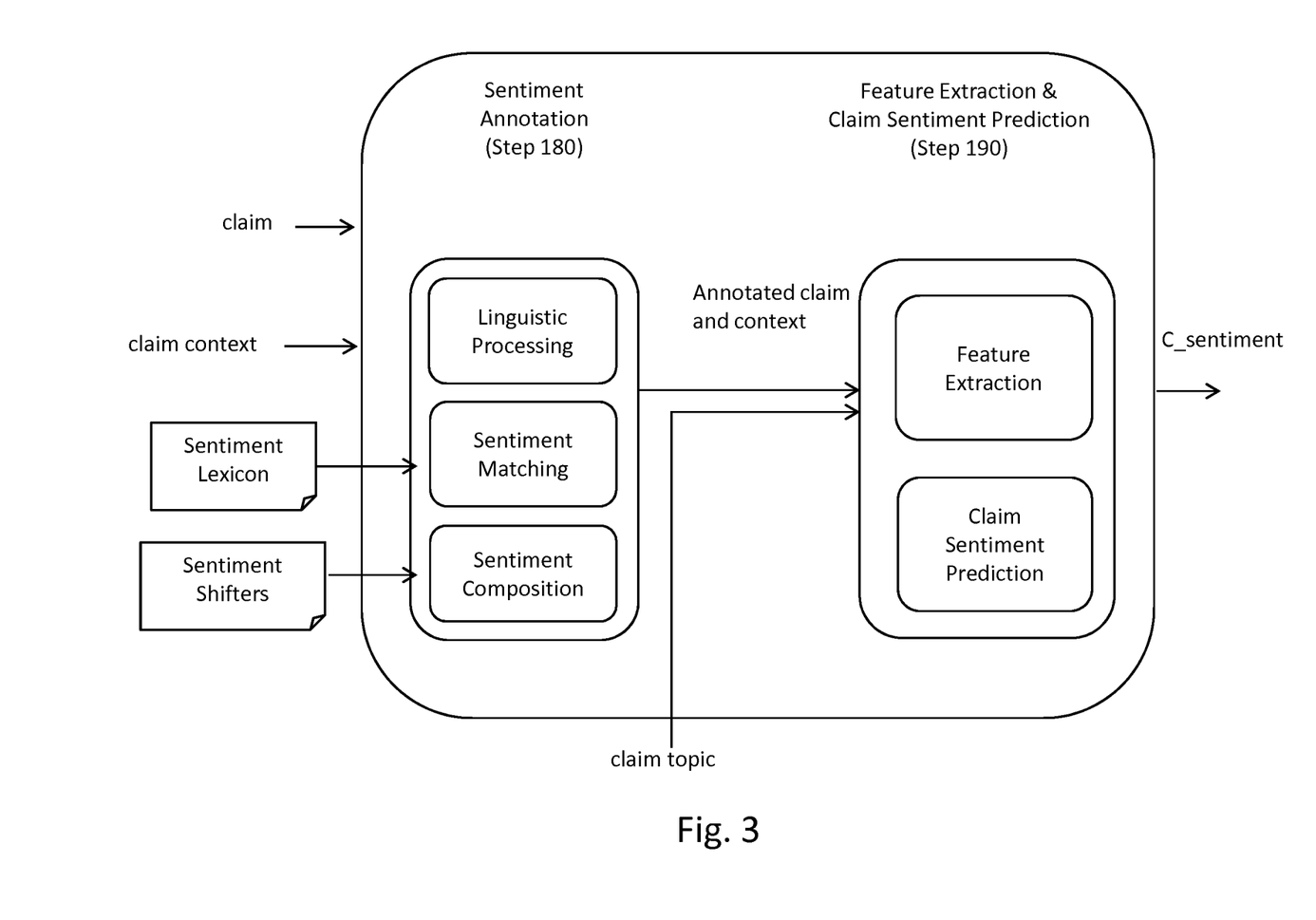
FIG. 3 shows a block diagram presenting the flow of claim sentiment analysis.

The claim sentiment towards the claim topic may be identified based on the content of the claim itself, and optionally may be also based on contextual cues (i.e., a context of the claim, such as the headers of a section or subsection of an article in which the claim appears), if a context of the claim is additionally received.

The claim context may include additional set of texts extracted from a content resource from which the claim itself was extracted. For example, if the claim was extracted from an article, its context may provide additional information that may be used to improve sentiment classification, as will be described below. For example, in many cases the headline of the section in the article in which the claim appears (e.g. "criticism", "problems", "benefits") may be indicative of its polarity.

Claim sentiment analysis may include two main steps: applying sentiment annotation to the claim and optionally to its context and extracting a set of features from the sentiment annotation results, and performing sentiment classification.

Accordingly, in a step 180, sentiment annotation may be applied to the claim and optionally to its context (if such is received). The goal of sentiment annotation is to identify in the received text (i.e., the claim text and optionally the claim context as well) phrases with positive and negative polarity. This identification may be performed in one or more steps, which may include techniques such as linguistic processing, sentiment matching and sentiment composition, as known in the art (for example: Bo Pang and Lillian Lee. Opinion mining and sentiment analysis. *Foundations and Trends in Information Retrieval* 2(1-2), pp. 1-135, 2008; Bing Liu. *Sentiment Analysis and Opinion Mining*. Morgan & Claypool Publishers. 2012).

In linguistic processing, standard Natural Language Processing (NLP) tools may be applied to the text. Shallow linguistic processing may include tokenization, lemmatization or stemming and part-of-speech tagging. Deep processing may include in addition syntactic parsing and possibly also derivation of predicate-argument structure.

In sentiment matching, words from available wide-coverage sentiment lexicons such as the Harvard General Inquirer (http://www.wjh.harvard.edu/~inquirer/) and/or the MPQA Subjectivity Lexicon (http://mpqa.cs.pitt.edu/#subj_lexicon) may be matched in the text. Matching may be based on the word's surface form, its lemma or stem, and its part-of speech. Each term in the sentiment lexicon may be associated with a score, for example, a positive score for a positive sentiment and a negative score for a negative sentiment. Scores may be uniform for all of the terms or vary for different terms, specifying their individual sentiment strength. A sentiment score may be assigned to each matched word in the text (unmatched words may be assigned with a zero score).

In sentiment composition, the sentiment of individual words may be modified based on analyzing their context. Examples may include sentiment shifters analysis and expressions containing mixed sentiment.

By sentiment shifters analysis, a reverse polarity of sentiment expressions may be identified due to the presence of certain words or expressions such as negators (e.g., not successful), adverbs (e.g., hardly successful), expressions (e.g., far from successful) and verbs (e.g., prevented success). The scope of the sentiment shifter may be inferred from the syntactic structure of the sentence, or, in case the syntactic structure is not available, may be approximated based on the distance from the sentiment word.

Expressions containing mixed sentiment such as "unfair (−) advantage(+)", (where (+) indicates a positive sentiment and (−) indicates a negative sentiment) may require special treatment, otherwise the opposite polarities may cancel out each other. This may be resolved by using some heuristics, such as defining rules for various syntactic configurations (as in Moilanen and Pulman, Sentiment Composition, *Recent Advances in Natural Language Processing* (RANLP) 2007). For example, when the expression is an adjective followed by a noun, the resulting polarity may be determined by the adjective. Alternatively, the stronger polarity may be preferred (if individual sentiment strength scores per word are available).

The output of sentiment annotation may be the input text (i.e. the claim text and optionally the context text), annotated with sentiment scores. Thus, each claim may be associated with scores reflecting its sentiment.

In a step 190, feature extraction and claim sentiment prediction may be performed by extracting a set of features, examples of which are disclosed below, based on the annotated claim and optionally context, and the extracted claim topic.

Examples for such features may be: the sum of positive/negative sentiments in the claim (while sentiment within the claim topic phrase may be ignored); similarly, the sum of positive/negative sentiments for each of the context types (header, subheader etc.), Additional features may include the weighted sum of positive/negative sentiments, where the aggregated scores are weighted by their proximity to the C_topic (i.e., sentiment words closer to the C_topic may be considered more relevant and therefore may receive a higher weight). Additional features may take into account the syntactic structure. For example, the sentiment of the main verb in the sentence, the subject, the object, etc.

Claim sentiment prediction may be performed by combining these feature values into a claim sentiment score predicting the strength of the claim sentiment. The combination of the feature values may be performed, for example, by using some predefined formula or by training a classifier.

In a step 200, contrast detection may be performed. Contrast detection may be used to determine whether the extracted claim topic (C_Topic) and the proposition topic (P_topic) are similar or opposite. Identification of the semantic relation between the C_topic and the P_topic by using, for example, lexical databases and ontologies such as WordNet and/or a thesaurus, may be performed. For example, if C_topic and P_topic are antonyms, then they are opposite. If they are synonyms or one is a hyponym of the other, then they are similar.

Corpus-based methods may also be used to determine the relation between C_topic and P_topic, e.g. counting in a large corpus the likelihood of C_topic and P_topic to appear in contrastive contexts (such as: "(C_topic) . . . however . . . (P_topic)") vs. non-contrastive contexts. Both methods may be combined as features in a classification function, which may be defined manually or learned automatically from training examples of similar and opposite topic pairs.

In a step 210, a local claim polarity may be calculated for a received claim. The calculation of the local claim polarity may be based on the claim sentiment, the proposition sentiment and the contrast relation. The relation between the claim sentiment, the proposition sentiment, the contrast relation and the claim polarity may be formalized as follows. Given a proposition P and a claim C, let P_sentiment denote the proposition sentiment, C_sentiment denote the claim sentiment and PC_contrast denote the contrast relation between C and P. The sentiment may be represented as a real-valued number between −1 and 1, where a positive number represents positive sentiment, zero represents no sentiment and a negative number represents negative sentiment. The absolute value of the sentiment may represent the magnitude of the sentiment or the confidence of the prediction. The contrast between the claim topic and the proposition topic PC_contrast may be also a real-valued number between −1 and 1, where a negative number represents opposite relation, a positive number represents similar relation and the absolute value represents the confidence of the prediction. The local claim polarity C_local_polarity (i.e., local pro/con score) may be then computed as:

$$C\_local\_polarity = P\_sentiment * C\_sentiment * PC\_contrast.$$

In the resulting local claim polarity, a positive value is interpreted as a Pro polarity, a negative value is interpreted as a Con polarity and the absolute value is the overall prediction confidence.

In a step 220, a pairwise claim polarity agreement score may be calculated for each pair of claims ($<claim_i, claim_j>$). The pairwise claim agreement score may reflect the likelihood of the pair of claims to have the same claim polarity. The pairwise claim agreement score may be calculated based on identified inter-claim relations between the pair of claims. The pairwise claim polarity agreement score calculated for a pair of claims may be associated with each claim of the pair of claims.

Figure 4:
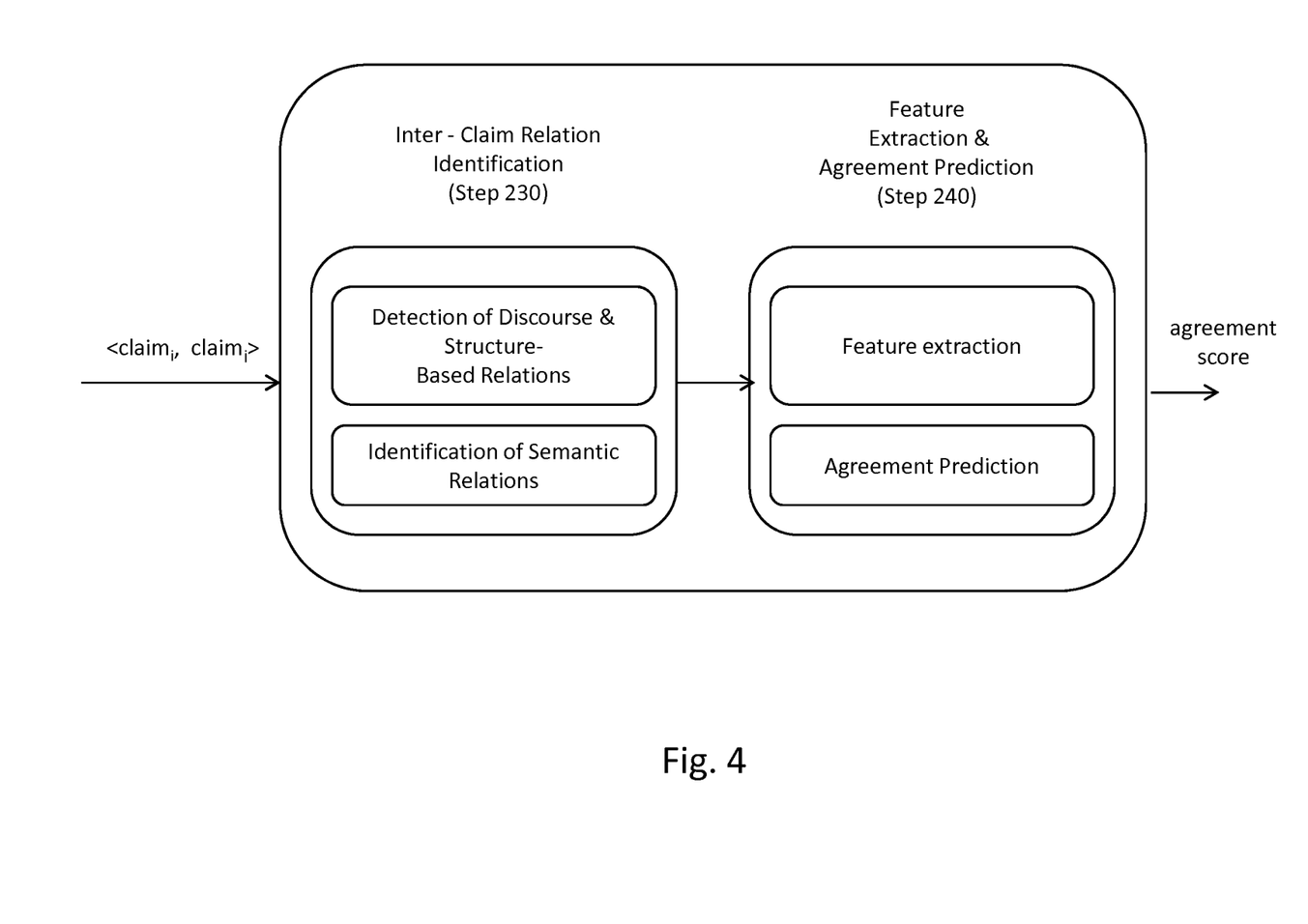
FIG. 4 shows a block diagram presenting the flow of calculation of pairwise claim polarity agreement score.

Reference is now made to FIG. 4, which shows a block diagram presenting the flow of the calculation of pairwise claim polarity agreement score. The goal of the module shown in this Fig. is to predict the likelihood of two given claims to have the same or opposite polarity.

Step 220 may include a step 230 of identification of inter-claim relations between pairs of claims of the plurality of claims. A pair of claim may include claims relating to different topics, if the proposition includes more than one topic. This step may aim to detect inter-claim relations that may indicate that a given two claims are likely to receive the same polarity or an opposite polarity. Types of relations which may be detected may include discourse and structure-based relations and semantic relations.

Discourse and structure-based relations between the claims may be identified. Claims in the same section, subsection or paragraph or claims in certain proximity from each other are likely to have the same polarity. Discourse connectives such as "similarly", "furthermore", may indicate that the claims have the same polarity, while contrasting connectives such as "however" and "on the other hand" may indicate opposite polarity.

Semantic relations between the claims (i.e., not necessarily in certain proximity from each other, or even between claims found in different content resources) may be identified. For example, if a claim A entails or generalizes claim B, then A and B may have the same polarity. If claim A contradicts claim B, then A and B have an opposite polarity. Current methods for entailment and contradiction detection are disclosed in: Ido Dagan, Dan Roth, Mark Sammons and Fabio Massimo Zanzotto, "Recognizing Textual Entailment: Models and Applications", Morgan & Claypool (2013), which is incorporated herein by reference in its entirety.

Step 220 may further include a step 240 of feature extraction and agreement prediction (i.e., agreement of polarity). This step may be similar to step 190 above. The identified relations may serve as features for determining the likelihood that a pair of claims may have the same polarity. As with the local polarity identification, agreement prediction may be performed by combining these feature values into an agreement score. The feature values may be combined using a predefined formula or by training a classifier.

In a step 250, a global claim polarity may be determined for each claim. A global claim polarity may be inferred for a claim based on the local claim polarity of the claim ($<claim_1, C\_local\_polarity_1>$) and its associated pairwise claim polarity agreement scores ($<claim_1, claim_2>$, agreement score$_{12}$).

At this stage, the received claims may be assigned a global polarity score based on the local claim polarity score and the pairwise claim agreement score. The above may be modeled as detailed herein below. The below model is based on: Bo Pang & Lillian Lee, 2004, A sentimental education: Sentiment analysis using subjectivity, Proceedings of ACL, pp. 271-278, 2004, which is herein incorporated by reference in its entirety.

Suppose that the local polarity classifier outputs for a claim c the probability of being a Pro claim between 0 and 1, which may be denoted as Ppro(c). This can be obtained by applying a linear transformation to the previously defined local polarity score, which may be between −1 and 1. Thus, one may define Pcon(c)=1−Ppro(c) (i.e., the probability of being a Con claim). One may further assume that Psame (c1,c2) is the probability that claims c1 and c2 have the same polarity, as predicted by the polarity agreement module. Let CL be the set of given claims, PRO is the set of claims labeled as Pro, and CON is the set of claims labeled as Con (PRO∪CON=CL, PRO∩CON=∅).

The goal may be then to find the partition (PRO, CON) (i.e., a partition between Pro claims and Con claims) that minimizes a cost function. The cost function may be as follows:

$$\Sigma_{c \in PRO} P_{con}(c) + \Sigma_{c \in CON} P_{pro}(c) + \Sigma_{c1 \in PRO, c2 \in CON} P_{same}(c1,c2)$$

That is to say, the cost function may equal the sum of the following: the sum of the probabilities of being a Con claim of the claims partitioned as Pro claims, the sum of the probabilities of being a Pro claim of the claims partitioned as Con claims and the sum of the probabilities that a pair of claims have the same polarity of all of the pairs of claims such that one claim is partitioned as Pro and the other as Con.

As shown in Pang & Lee, this problem may be solved using efficient techniques for finding minimum cuts in graphs.

Alternatively, a different approach may be used in order to determine the global claim polarity for each claim. According to this approach, pairwise claim polarity agreement score calculation is not performed (i.e., according to steps 220-240, and as described in FIG. 4). Instead, a commonality approach may be used, in which clusters of claims in the same document that are likely to have the same polarity are identified. For example, two claims may be assigned to the same cluster if they are in the same section (e.g., a section of an article) and if they are not separated by connectives that may indicate a possible flip of polarity (hereinafter "flip-of-polarity connectives"), such as "although", "however" and "on the other hand". Then, the local claim polarity score of each claim may be updated by adding to its original score the sum of all the claim polarity scores of the claims in the cluster, multiplied by some constant serving as a weight. This updated claim polarity score is the global claim polarity score.

In a step 260, a list of the received claims, indicating their polarity may be outputted. The list of claims may include the proposition. The claims in the list may be sorted according to their polarity and/or the confidence of the final polarity prediction. Such confidence may be represented by the absolute value of the local polarity score. The output of the list of claims may be such that it may be used by a human or by a machine, including software components (e.g., when the disclosed claim detection is incorporated in a more extensive tool). The output may be presented to the user, e.g., by displaying the list of claims, uttering (i.e., by using known in the art text-to-speech techniques) it or by printing it.

Figure 5:
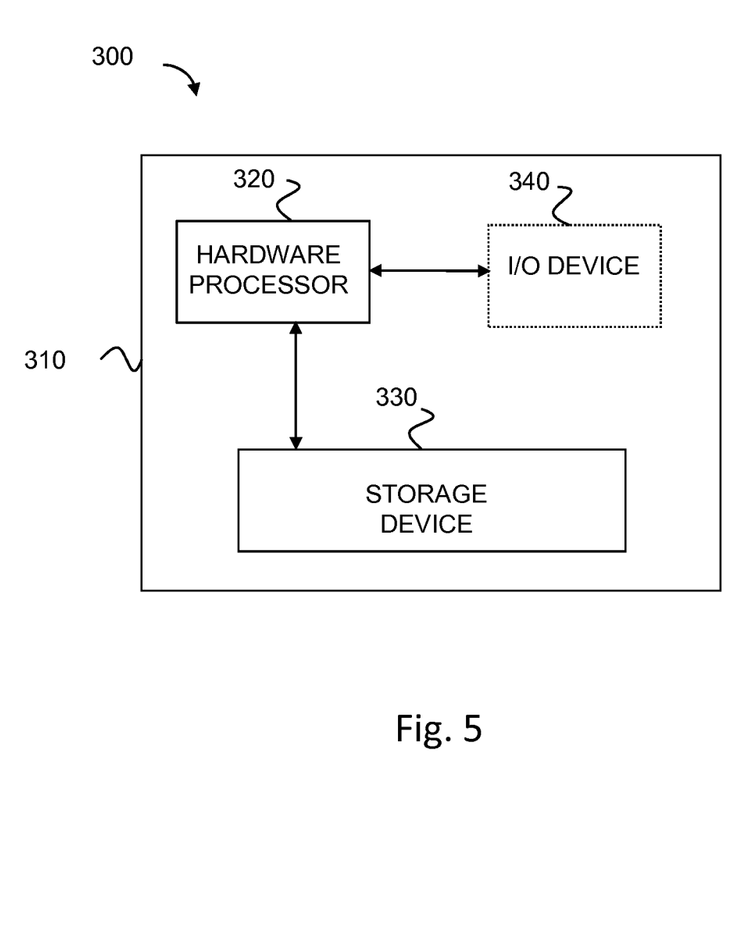
FIG. 5 shows an exemplary system according to an embodiment.

Reference is now made to FIG. 5, which shows an exemplary system 300 according to an embodiment. System 300 may include a computing device 310. Computing device 310 may include a hardware processor 320 and a storage device 330. Computing device 310 may further include an input/output ("I/O") device 340. Hardware processor 320 may include one or more hardware processors, storage device 330 may include one or more storage devices and I/O device 340 may include one or more I/O devices. Hardware processor 320 may be configured to execute the method of FIG. 1. I/O device 340 may be configured to allow a user to interact with system 300. For example, I/O device 340 may include a display, a loudspeaker and/or a printer which may for example output a list of received claims indicating their polarity with respect to a received proposition for a user according to the methods of FIGS. 1-4. Dedicated software, implementing the methods of FIGS. 1-4 may be stored on storage device 330 and executed by hardware processor 320.

In some embodiments, computing device 310 may include an I/O device 340 such as a terminal, a display, a keyboard, a mouse, a touch screen, a loudspeaker, a printer, an input device or the like to interact with system 300, to invoke system 300 and to receive results. It will however be appreciated that system 300 may operate without human operation and without I/O device 340.

In some exemplary embodiments of the disclosed subject matter, storage device 330 may include or be loaded with a user interface. The user interface may be utilized to receive input, such a proposition and a plurality of claims and optionally their context and/or provide output, such as a list of the claims indicating their polarity, to and from system 300, including receiving specific user commands or parameters related to system 300, providing output, or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computerized text analytics method comprising using at least one hardware processor for:
   receiving: (a) a proposition, wherein the proposition is a text sentence, and (b) a plurality of claims, wherein each of the plurality of claims is a text sentence; and
   performing sentiment analysis of the proposition and the plurality of claims, to determine a polarity of each of the plurality of claims with respect to the proposition, by:
      providing a textual proposition template which comprises: (a) a placeholder for a topic, (b) a placeholder for one of: a sentiment verb and a sentiment adjective, and (c) a text in between the two placeholders,
      analyzing the text sentence of the proposition, to identify a proposition topic and a proposition sentiment towards the proposition topic, wherein said analyzing is by matching the text sentence of the proposition with the textual proposition template,
      identifying a local claim polarity of each of the received claims with respect to the proposition, by:
         extracting a claim topic from the respective claim by applying, to the text sentence of the respective claim, one of: a manually-set function, and a classifier trained using machine learning,
         identifying a claim sentiment towards the extracted claim topic, at least by applying a technique selected from the group consisting of: Natural Language Processing (NLP), sentiment matching, and sentiment composition, to at least one of (a) the text sentence of the respective claim, and (b) text extracted from a content resources from which the text sentence of the respective claim originated, wherein the identified claim sentiment towards the extracted claim topic comprises one of: a negative claim sentiment and a positive claim sentiment, and
         calculating the local claim polarity of the respective claim based at least on: the identified proposition topic, the identified claim sentiment towards the extracted claim topic, the identified proposition topic, and the identified proposition sentiment towards the proposition topic,
      calculating a pairwise claim polarity agreement score of every pair of the received claims, by detecting at least one of: (a) a discourse connective appearing between the claims of the respective pair, and (b) textual entailment appearing between the claims of the respective pair,
      determining a global claim polarity of each of the received claims, based on the calculated local claim polarity of the respective claim, and on the calculated pairwise claim polarity agreement score of the respective pair of the respective claim; and
   outputting a list of the received claims and of an indication of the global claim polarity of each of the received claims.

2. The method according to claim 1, wherein the determining of the global claim polarity is based on a clustering of the received claims according to commonality.

3. The method according to claim 2, wherein the commonality is determined based on a lack of a flip-of-polarity connective between a pair of the received claims.

4. The method of claim 1, wherein the identifying of the claim sentiment towards the extracted claim topic is further by:
   identifying phrases in the respective claim with positive and negative polarity, by applying to the respective claim a computerized technique selected from the group consisting of: linguistic processing, sentiment matching, and sentiment composition,
   applying a sentiment annotation to each of the identified phrases in the respective claim, wherein the sentiment annotation is selected from the group consisting of: a positive annotation and a negative annotation,
   extracting a set of features from the identified phrases and from their respective sentiment annotations, and
   performing sentiment classification of the extracted set of features, using at leas one of: a predefined classification formula, and a trained classifier.

5. The method of claim 1, wherein said determining of the global claim polarity comprises modeling the global claim polarity as a partition between respective claims having a negative sentiment (Pro) and respective claims having a positive sentiment (Con), wherein the partition minimizes a cost function.

6. The method of claim 5, wherein said cost function equals the sum of:
   the sum of the probabilities of being a Con claim of the claims of said plurality of claims partitioned as Pro claims;

the sum of the probabilities of being a Pro claim of the claims of said plurality of claims partitioned as Con claims; and the sum of the probabilities that a pair of claims have the same polarity of all of the pairs of claims of said plurality of claims such that one claim is partitioned as Pro and the other as Con.

7. A computer program product comprising a non-transitory computer-readable storage medium having program code embodied therewith, the program code executable by at least one hardware processor for:

Receiving: (a) a proposition, wherein the proposition is a text sentence, and (b) a plurality of claims, wherein each of the plurality of claims is a text sentence;

performing sentiment analysis of the proposition and the plurality of claims, to determine a polarity of each of the plurality of claims with respect to the proposition, by:

providing a textual proposition template which comprises: (a) a placeholder for a topic, (b) a placeholder for one of: a sentiment verb and a sentiment adjective, and (c) a text in between the two placeholders, analyzing the text sentence of the proposition, to identify a proposition topic and a proposition sentiment towards the proposition topic, wherein said analyzing is by matching the text sentence of the proposition with the textual proposition template, identifying a local claim polarity of each of the received claims with respect to the proposition, by:

extracting a claim topic from the respective claim by applying, to the text sentence of the respective claim, one of: a manually-set function, and a classifier trained using machine learning, identifying a claim sentiment towards the extracted claim topic, at least by applying a technique selected from the group consisting of: Natural Language Processing (NLP), sentiment matching, and sentiment composition, to at least one of (a) the text sentence of the respective claim, and (b) text extracted from a content resources from which the text sentence of the respective claim originated, wherein the identified claim sentiment towards the extracted claim topic comprises one of: a negative claim sentiment and a positive claim sentiment, and calculating the local claim polarity of the respective claim based at least on: the identified proposition topic, the identified claim sentiment towards the extracted claim topic, the identified proposition topic, and the identified proposition sentiment towards the proposition topic, calculating a pairwise claim polarity agreement score of every pair of the received claims, by detecting at least one of: (a) a discourse connective appearing between the claims of the respective pair, and (b) textual entailment appearing between the claims of the respective pair, determining a global claim polarity of each of the received claims, based on the calculated local claim polarity of the respective claim, and on the calculated pairwise claim polarity agreement score of the respective pair of the respective claim; and outputting a list of the received claims and of an indication of the global claim polarity of each of the received claims.

8. The computer program product according to claim 7, wherein the determining of the global claim polarity is based on a clustering of the received claims according to commonality.

9. The computer program product according to claim 8, wherein the commonality is determined based on a lack of a flip-of-polarity connective between a pair of the received claims.

10. The computer program product of claim 7, wherein the identifying of the claim sentiment towards the extracted claim topic is further by:

identifying phrases in the respective claim with positive and negative polarity, by applying to the respective claim a computerized technique selected from the group consisting of: linguistic processing, sentiment matching, and sentiment composition, applying a sentiment annotation to each of the identified phrases in the respective claim, wherein the sentiment annotation is selected from the group consisting of: a positive annotation and a negative annotation, extracting a set of features from the identified phrases and from their respective sentiment annotations, and performing sentiment classification of the extracted set of features, using at least one of: a predefined classification formula, and a trained classifier.

11. The computer program product of claim 7, wherein said determining of the global claim polarity comprises modeling the global claim polarity as a partition between respective claims having a negative sentiment (Pro) and respective claims having a positive sentiment (Con), wherein the partition minimizes a cost function.

12. The computer program product of claim 11, wherein said cost function equals the sum of:

the sum of the probabilities of being a Con claim of the claims of said plurality of claims partitioned as Pro claims;

the sum of the probabilities of being a Pro claim of the claims of said plurality of claims partitioned as Con claims; and the sum of the probabilities that a pair of claims have the same polarity of all of the pairs of claims of said plurality of claims such that one claim is partitioned as Pro and the other as Con.

13. A system comprising:

(i) a non-transitory storage device having stored thereon instructions for:

receiving (a) a proposition, wherein the proposition is a text sentence, and (b) a plurality of claims, wherein each of the plurality of claims is a text sentence, performing sentiment analysis of the proposition and the plurality of claims, to determine a polarity of each of the plurality of claims with respect to the proposition, by:

providing a textual proposition template which comprises: (a) a placeholder for a topic, (b) a placeholder for one of: a sentiment verb and a sentiment adjective, and (c) a text in between the two placeholders, analyzing the text sentence of the proposition, to identify a proposition topic and a proposition sentiment towards the proposition topic, wherein said analyzing is by matching the text sentence of the proposition with the textual proposition template, identifying a local claim polarity of each of the received claims with respect to the proposition, by:

extracting a claim topic from the respective claim by applying, to the text sentence of the respective claim, one of: a manually-set function, and a classifier trained using machine learning, identifying a claim sentiment towards the extracted claim topic, at least by applying a technique selected from the group consisting of: Natural Language Processing (NLP), sentiment matching, and sentiment composition, to at least one of (a) the text sentence of the respective claim, and (b) text extracted from a content resources from which the text sentence of the respective claim originated, wherein the identified claim sentiment towards the extracted claim topic comprises one of: a negative claim sentiment and a positive claim sentiment, and calculating the local claim polarity of the respective claim based at least on: the identified proposition topic, the identified claim sentiment towards the extracted claim topic, the identified proposition topic, and the identified proposition sentiment towards the proposition topic, calculating a pairwise claim polarity agreement score of every pair of the received claims, by detecting at least one of: (a) a discourse connective appearing between the claims of the respective pair, and (b) textual entailment appearing between the claims of the respective pair, determining a global claim polarity of each of the received claims, based on the calculated local claim polarity of the respective claim, and on the calculated pairwise claim polarity agreement score of the respective pair of the respective claim, and outputting a list of the received claims and of an indication of the global claim polarity of each of the received claims; and (ii) at least one hardware processor configured to execute said instructions.

* * * * *